Sept. 27, 1955     C. E. ADAMS ET AL     2,719,111
CATALYTIC PROCESS
Filed June 29, 1951
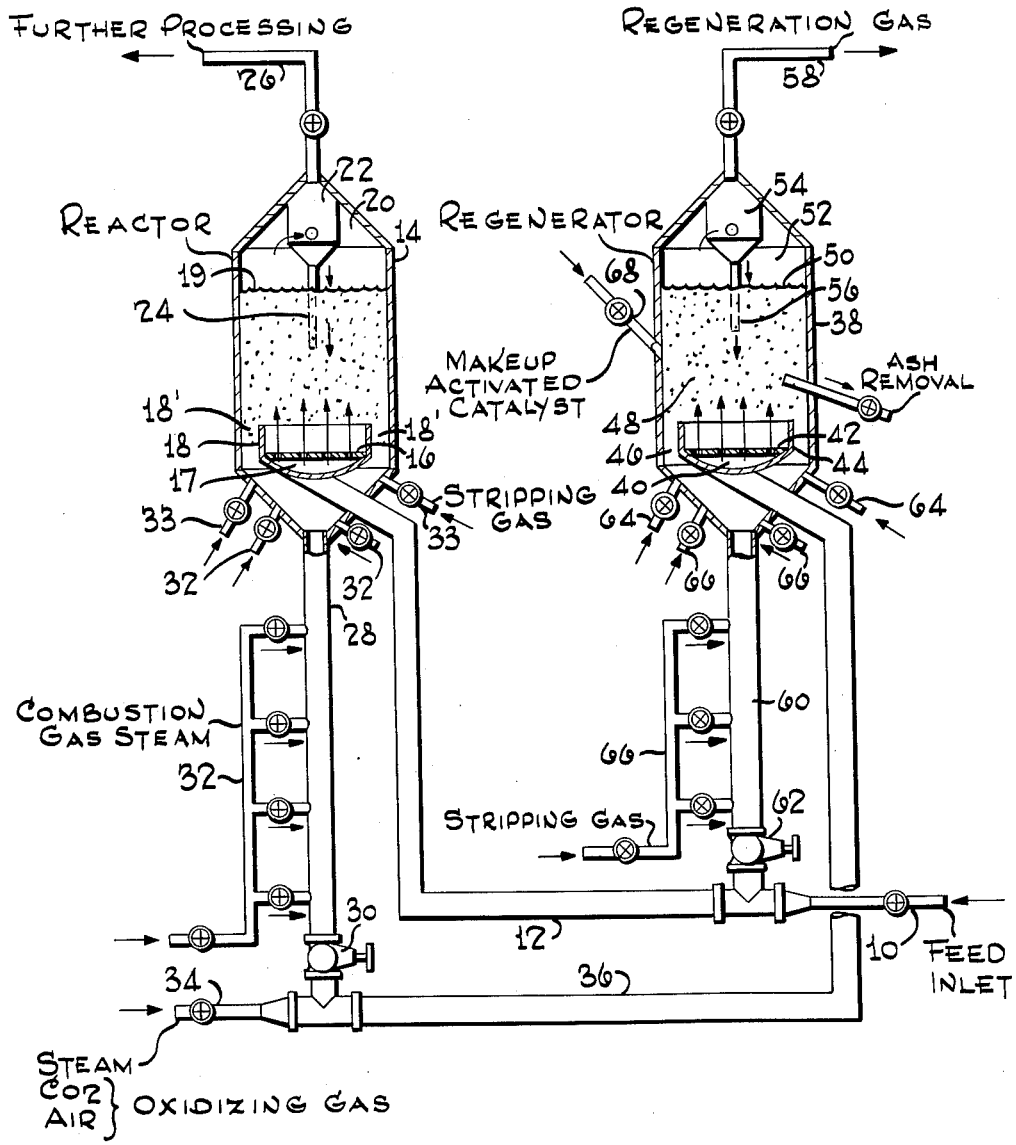
Clark E. Adams   Inventors
Charles N. Kimberlin Jr.
By J. Cashman    Attorney ized State<br>Patented Sept. 27, 1955

2,719,111
CATALYTIC PROCESS

Clark E. Adams and Charles N. Kimberlin, Jr., Baton Rouge, La., assignors to Esso Research and Engineering Company, a corporation of Delaware Application June 29, 1951, Serial No. 234,406

5 Claims. (Cl. 196—50)

This application is a continuation-in-part of application Serial No. 100,038, filed June 18, 1949, for "A Catalytic Process," now abandoned.

This invention relates to the conversion of hydrocarbons and more particularly to the improvement of light virgin naphthas for use as motor fuels.

It is the principal object of this invention to provide a process for the improvement of light petroleum virgin naphthas falling substantially within the boiling range of from about 100°–275° F. by treating these petroleum fractions in the presence of "activated" carbon as a catalyst.

Another object of this invention is to provide a process for catalytically converting petroleum fractions of the above character to petroleum products having an increased octane number and other desirable properties by subjecting them to desired operation conditions in the presence of an activated carbon catalyst in fluidized state and to operate the process independently of an external source of activated carbon by manufacturing the activated carbon catalyst within the process itself.

Briefly stated the invention comprises a process whereby a hydrocarbon fraction is admixed with a diluent such as steam, process gas, hydrogen, or the like, subjected to a pressure within a range of from about atmospheric to 1000 p. s. i. g., a temperature within the range of from about 800° F. to 1100° F., for a period of time of from about 0.01 second to 2.0 seconds in the presence of an active form of carbon as a catalyst.

During the course of the reaction, the catalyst particles become contaminated by the deposition of carbon and other carbonaceous materials on the catalytic surfaces and it becomes necessary to remove these contaminants to restore the high level of catalytic activity desired. To accomplish this, the catalyst is continuously removed to a reactivating or regeneration vessel in which the catalyst is also maintained in a fluidized condition. Suitable temperatures, that is to say, temperatures within a range of from 1200 to 2000° F., are maintained in the reactivating vessel for reactivating or regenerating the catalyst. To this reactivating vessel activating gases such as steam, flue gas, carbon dioxide, air and the like, are fed. When air is used as the reactivating gas it also serves as a source of heat by burning the deposited carbon. Other means of supplying heat to the reactivating vessel may of course be utilized. The reactivated carbon is continuously recycled from this reactivating vessel into the reaction vessel.

An especially desirable feature of the present invention is that it can operate independently of an external source of activated carbon. This is accomplished in the present process by feeding into the system some carbonaceous material which is capable of being converted into a catalytically active carbon. These carbonaceous materials include peat, lignite, coal, low temperature coke, carbon coke, petroleum coke, and the like. They are added to the system in a mass depending upon the rate at which the catalyst is dissipated or used up. This amount should vary in normal operating processes from about 1% to 10% by weight of inventory per day. The carbonaceous materials may be added to either the reaction section or the reactivating section, but they are preferably added to the reactivating or regeneration section.

Due to the low rate of deactivation of the catalyst during hydrocarbon fraction improvement, the reactivating or regeneration section of the process may be relatively small as compared with the reaction section.

The preferred catalyst particle size is the same as that for other fluid catalyst process, that is, within a range of from 10 to 500 microns in diameter, preferably 20 to 150 microns, however other catalyst particle sizes are operable.

The invention may be further described by reference to the accompanying drawing in which the figure represents one form of an apparatus for carrying out this invention.

Referring to the drawing, numeral 10 designates a feed inlet. The feed is a virgin naphtha boiling within the range of from 100° to 275° F.

The feed entering through line 10 is admixed in line 12 with a moving stream of an activated carbon catalyst. If it is desired, a diluent gas such as steam, hydrogen, or process gas may be admixed with the hydrocarbon feed and fed through line 10 into line 12. A diluent is not necessary but it is often very desirable for the following purposes:

1. As a heat carrier to introduce heat of reaction.
2. To increase velocity in the reactor for improved fluidization.
3. To adjust contact time and partial pressure of the hydrocarbon feed.

The mixture of feed and activated carbon catalyst passes through line 12 and into vessel 14 through a distributor plate 16. This distributor plate is superimposed on an inverted cone designated by reference character 17. Distributor plate 16 is surrounded by an annular member 18 which forms, with the side of reaction vessel 14, an annular stripping zone designated by reference character 18'.

The velocity of the reactive gases entering vessel 14 and passing upwardly through inverted cone 17 and distributor plate 16 is so selected that the catalyst particles are maintained as a fluidized bed having many of the characteristics of a liquid. The superficial velocity of the reactive gases is maintained at one within the range of from about 0.1 to 2.0 feet per second when using an activated carbon catalyst having a particle size within a range of from 10 to 500 microns in diameter.

The fluidized bed has an upper dense phase level indicated at 19 and will have a density in the range of from 15 to 30 pounds per cu. ft. depending upon the conditions of operation. A less dense phase designated by reference character 20 will exist in the reaction vessel above the level of the fluidized bed 19 and will have a catalyst density of between 0.0 and 1.0 pounds per cu. ft. depending also on the conditions in the reaction zone. The height of the fluidized bed may be varied as desired by withdrawing catalyst directly from the dense phase of the bed.

The temperature in vessel 14 is maintained at one within a range of from 800° to 1200° F. preferably between 950° F. and 1100° F.

The velocity of the reactant gases flowing upwardly through the fluidized bed in vessel 14 is so selected to permit a hydrocarbon residence time within the vessel of from about 0.01 second to 2.0 seconds, preferably 0.01 to 1.0 second. Pressures within vessel 14 may be varied from atmospheric to about 1000 p. s. i. g. but the preferred pressures are from atmospheric to about 400 p. s. i. g.

The reactant gases in vessel 14 pass upwardly through the fluidized bed and into cyclone separator 22. In this separator any entrained catalyst particles are separated from the gases and deposited beneath the level of the fluidized bed 19 by means of dip pipe 24. The product gases having been stripped from any entrained catalyst particles pass through line 26 to other equipment not shown, for further processing.

Communicating with the bottom of vessel 14 is a standpipe 28 equipped with a slide valve 30. Fluidized condition of the catalyst particles in standpipe 28 and the lower portion of vessel 14 is maintained by injecting a fluidizing gas such as combustion gas, steam and the like through fluidizing lines 32. A stripping gas such as combustion gas, steam, etc., is introduced into the annular stripping zone 18' by means of lines 33. This stripping gas strips from the catalyst in the annular stripping zone any entrained reactant gases.

Catalyst is continuously withdrawn from the bottom of reaction vessel 14 through standpipe 28 and slide valve 30. An oxidizing or activating gas such as steam, carbon dioxide, air, and the like is admitted through line 34 and transports the fluidized catalyst particles through line 36 and into regenerator vessel 38. Line 36 communicates with an inverted cone formation 40 upon which is superimposed a perforated distributor plate 42. Inverted cone formation 40 and distributor plate 42 are surrounded by an annular member 44 which forms with the sides of the regenerator vessel 38 an annular stripping chamber, designated by reference character 46. The mixture or suspension of spent catalytic particles to be regenerated and the oxidizing gas pass upwardly through the distributor plate 42 and are equally distributed across the lower portion of regenerator vessel 38.

The velocity of the reactivating gas is so selected that the catalyst particles to be regenerated are maintained in a fluidized bed 48 having many of the characteristics of a liquid. The fluidized bed 48 has a level as indicated at 50 and will have a density in the range of from 15 to 30 pounds per cu. ft. depending on the conditions of operation. Above the fluidized bed level 50 is a zone of less density 52. The catalyst density in this zone will vary from about 0.0 to 1.0 pound per cu. ft. depending also on the conditions in the zone. The height of fluidized bed 48 may be varied as desired by withdrawing catalyst directly from the dense phase of the bed.

The superficial velocity of the reactant gases in regenerator vessel 38 is maintained at one within a range of from about 0.1 to 2.0 ft. per second when using an activated carbon catalyst having a particle size within a range of from 10 to 500 microns in diameter.

The temperature maintained in the regenerator vessel 38 is one within a range of from 1200° F. to 2000° F., preferably 1400° F. to 1600° F. At these temperatures all of carbonaceous deposits upon the surface of the catalyst particles are removed by being oxidized when air is used or by the water gas reaction if steam is used as an oxidizing agent or medium. The regeneration gases pass upwardly through the dense bed 48 and the less dense phase 52 and enter cyclone separator 54. Here the entrained catalyst particles are removed and deposited beneath the surface of the catalyst bed by means of dip pipe 56. The regeneration gases are vented through line 58.

Regenerated carbon catalyst particles are continuously removed from the dense bed 48 by passing downwardly through annular stripping chamber 46 and into regenerator standpipe 60. Standpipe 60 is equipped with slide valve 62. The catalyst passing downwardly through the annular stripping chamber 48 is subjected to a stripping gas such as steam, or the like which is introduced into annular stripping chamber 46 through inlet 64. When steam is used as the activating medium, no stripping is necessary. The catalyst particles in standpipe 60 and the bottom portion of vessel 38 are maintained in a fluid state by means of a fluidizing gas injected through lines 66.

Regenerator vessel 38 is equipped with an inlet line 68 which communicates with the vessel at a point below the fluid level 50. It is through this inlet line that the carbonaceous material which is the source of make-up activated carbon catalyst is admitted.

This carbonaceous material may be any material capable of being activated to activated carbon such as peat, lignite coal, low temperature coke, petroleum coke, animal or vegetable carbons, wood and the like. Before being admitted to regenerator 38, these materials are ground or shaped to the desired particle size such as one within a range of from 10 to 500 microns in diameter, preferably 20 to 150 microns in diameter.

When the particles of the carbonaceous materials of the desired size are admitted to regenerator 38 beneath the level of the fluid bed, they are subjected to a temperature within a range of 1200° F. to 2000° F., preferably 1400° F. to 1600° F. In the presence of an oxidizing gas such as air or steam, which enters regenerator 38 through lines 34 and 36, the particles of carbonaceous material are converted to particles of activated carbon. This is accomplished by the removal of the surface film of complex material by burning, leaving an unsaturated lattice structure of very active carbon atoms on the surface of the carbon particles which are readily available to catalyze changes in molecular structure of hydrocarbon molecules with which they come in contact. The turbulent mixing of fluid bed 48 maintains substantially equal temperatures throughout the bed and insures equality of oxidation over all the surface area of the particles. It will be found necessary to add approximately 1 to 10% by weight of the catalyst inventory per day; if the material added (for example, lignite) contains much volatile matter, larger quantities will be required. Additional ash may be removed directly from the fluid bed 48 in the regenerator 38 through the ash removal line shown in such amounts as are necessary to maintain the carbon content of the catalyst at the desired level.

The invention will be further explained by reference to the following examples, setting forth actual runs using an active coke derived from coal.

EXAMPLE I

*Activated carbon reforming of virgin naphthas*

*Coke from Pittsburgh coal activated by treatment with steam at about 1400° F.*

*5:1 mole ratio steam to naphtha fed*

| | |
|---|---|
| Run No., ECT-A- | 2 |
| Feed rate, v./v./hr | 0.80 |
| Steam diluent, C. F./B | 5,580 |
| Avg. mid. cat. temp., °F | 1,040 |
| Pressure, p. s. i. g | 75 |
| Hours run | 8.0 |
| Material balance, wt. percent | 92.4 |
| Gas, make ($C_3$—), C. F./B | 813 |

| | Feed, Virgin Naphtha | Stabilized Product |
|---|---|---|
| Gravity, °API | 68.3 | 62.1 |
| Distillation, IBP, °F | 157 | 100 |
| 5% @ °F | 165 | 130 |
| 10% @ °F | 167 | 140 |
| 20% @ °F | 168 | 150 |
| 30% @ °F | 170 | 157 |
| 40% @ °F | 172 | 162 |
| 50% @ °F | 174 | 166 |
| 60% @ °F | 177 | 171 |
| 70% @ °F | 180 | 177 |
| 80% @ °F | 185 | 183 |
| 90% @ °F | 191 | 197 |
| 95% @ °F | 196 | 215 |
| FBP, °F | 204 | 262 |
| Recovery, percent | 99.0 | 98.0 |
| Residue, percent | 0.5 | 1.0 |
| Aniline pt., °F | 133 | 83 |
| Bromine No., cg/g | 0 | 32 |
| RI, D @ 20° C | 1.3945 | 1.4113 |
| Specific dispersion, (F–C) | | 122.4 |
| Reid V. P., p. s. i. g | 4.0 | 10.2 |
| CFR-Res. O. N | 64.8 | 86.4 |
| Fluoborate deposit factor | | |

EXAMPLE I—Continued

|  | Feed, Virgin Naptha | Stabilized Product |
|---|---|---|
| Diene deposit factor | | [3] 0.763 |
| Yields (output basis): | | |
| Coke, wt. percent | | 1.7 |
| Gas (C₃—), wt. percent | | 19.2 |
| Mole percent—H₂ | | 26.8 |
| CH₄ | | 28.9 |
| C₂H₄ | | 4.3 |
| C₂H₆ | | 19.5 |
| C₃H₆ | | 4.7 |
| C₃H₈ | | 15.8 |
| C₄, wt. percent [1] | | 4.9(27.2) |
| C₅+, weight percent | | 74.2 |
| Gasoline (100% C₄+): | | |
| Yield, vol. percent output | | 78.4 |
| CFR-Res. Oct. No | | 87.5 |
| Reid V. P., p. s. i. g | | 14.6 |
| Gasoline (10# RVP+NSP): | | |
| Yield, vol. percent output | | 74.5 |
| CFR-Res. Oct. No | | 87.0 |
| Excess butane, ± vol. percent output | | +4.4 |
| S. A. cat. out: [2] | | |
| Average, M²/g | | 605 |
| Top, M²/g | | 806 |
| Middle, M²/g | | 710 |
| Bottom, M²/g | | 361 |

[1] Numbers in parentheses are wt. percent butenes in total C₄ cut.
[2] S. A. fresh catalyst 1030 M²/g. (S. A.=surface area).
[3] Diene index, applicable to light gasoline.

EXAMPLE II

*Reforming light naphtha with activated carbon*

| | |
|---|---|
| Run No | ECT-62 |
| Feed: E. Tex. virgin nap. cut, °F | 108/217 |
| Activated carbon cat. No | 47054 |
| SA, M²/g | 1,200 |
| Run hours | 1-7.5 |
| Catalyst temp., avg., °F | 1,058 |
| System pressure, p. s. i. g | 75 |
| Feed rate, v./v./hr | 0.95 |
| Hydrogen out, cu. ft./bbl | 6,130 |
| C₁ and C₂ gas out, cu. ft./bbl | 455 |
| Catalyst deposit, wt. percent feed | 0.8 |
| Material balance, wt. percent | 99.3 |
| Surface area cat. out, M²/g | 815 |

|  | Feed, Virgin Naphtha | Product |
|---|---|---|
| Inspection product (uncorrected): | | |
| Gravity, °API | 72.6 | [1] 61.1 |
| Initial B. P., °F | 108 | 118 |
| 5% @ °F | 127 | 135 |
| 10% @ °F | 134 | 138 |
| 20% @ °F | 142 | 144 |
| 30% @ °F | 149 | 149 |
| 40% @ °F | 157 | 155 |
| 50% @ °F | 164 | 162 |
| 60% @ °F | 171 | 169 |
| 70% @ °F | 177 | 177 |
| 80% @ °F | 186 | 187 |
| 90% @ °F | 196 | 207 |
| 95% @ °F | 205 | 232 |
| FBP, °F | 217 | 270 |
| Recovery, percent | 98.0 | 98.5 |
| Residue, percent | 0.5 | 1.0 |
| Aniline pt., °F | 135 | 77 |
| Bromine No | 0 | 41 |
| RI @ 20° C. D | 1.3870 | 1.4125 |
| Spec. disp | 97.1 | 123.4 |
| Reid V. P., p. s. i. g | 7.7 | 7.3 |
| Octane No., CFR-Res | 72.0 | 88.5 |
| Yields (100 wt. percent mat. bal.), vol. %: | | |
| C₅+gasoline | | 58.3 |
| C₄ [2] | | 14.3(8) |
| C₃ [2] | | 18.6(18) |
| Gasoline (100% C₄+rec.): | | |
| Yield, vol. percent | | 72.6 |
| Reid VP, p. s. i. g | | 18.2 |
| Octane No., CFR-Res. Cl | | 91.0 |
| Gasoline, 10# RVP+non selec. pol.: | | |
| Yield, vol. percent | | 61.2 |
| Octane No., CFR-Res | | 89.9 |

[1] Debutanized product.
[2] Numbers in parentheses are volume percent olefins.

The most economical form of activated coke employable in the present invention is from coal which has been coked. The coke which is suitable is a low temperature coke, and this may be activated with steam at temperatures of 1400°–1600° F. Of course, as already indicated, a petroleum coke may also be activated by treatment with steam, as well as the other forms of coke or activated carbon previously mentioned. The utility of the present operation lies in the fact that the hydroforming catalyst is relatively inexpensive and can be regenerated with steam. It can be used over and over even when its carbon content becomes rather low and its ash content correspondingly increases. Eventually, of course, the coke obtained has such a high percentage of ash that it must be rejected from the system and make-up activated carbon added to replace that withdrawn.

Another important aspect of the present invention, as previously indicated, lies in the fact that the so-called light ends of the virgin naphtha may be greatly improved by the present reforming reaction or treatment. In so far as is known there has not been heretofore any successful process for improving the octane number of the light ends of the virgin naphtha. The foregoing data show for example in Example I that the octane number of the feed may be raised from 64.8 to 87.0 in the 10 lb. Reid vapor pressure gasoline and a yield of 74.5% product was obtained. Heretofore the middle cut of naphthas were hydroformed. That is to say, the fractions boiling between about 200–360° F. Consequently the advance in the art here is not only the use of a relatively cheap catalyst but also the improvement in octane number of these light ends of the virgin naphtha.

Referring again to the ash content of the catalyst, it is pointed out that the fresh coal or coke should be added to the system and the ash withdrawn at such a rate as to maintain a carbon concentration in the catalyst of from 30 to 70 wt. per cent. Because of the fine state of subdivision of the ash, the latter is preferentially carried overhead with the products from the reactor 14, a rough separation of carbon from ash being effected in cyclone 22. Also ash is carried overhead from regenerator 38 so that the removal of ash from the system is more or less automatic.

Numerous modifications of the present invention may be made by those familiar with the art without departing from the spirit thereof.

What is claimed is:

1. A method for reforming virgin naphthas boiling within the range of 100°–275° F., which comprises the steps of providing a fluidized bed of finely divided catalyst particles consisting essentially of carbon particles previously activated at a temperature in the range of 1200°–2000° F.; charging to said bed the virgin naphtha; maintaining said naphthas in contact with said bed of catalyst at reforming conditions of temperature and pressure for a sufficient period of time to effect the desired conversion; withdrawing the catalyst from the reforming operation; charging it to a regeneration zone wherein it is treated at a temperature of 1200°–2000° F. with an oxidizing gas selected from the class consisting of air, steam and carbon dioxide; continually adding to said regeneration zone fresh carbonaceous material subsequently carbonized and activated therein, while selectively removing spent carbon particle fines of high ash content with the overhead gases from said reforming operation and from said regeneration zone; and controlling the rate of said addition and said withdrawal to maintain a carbon concentration of at least about 30 to 70 weight per cent in the regenerated catalyst returned to the reforming step.

2. The process of claim 1, including the additional step of withdrawing additional ash-containing catalyst particles directly from within the fluid bed in said regeneration zone.

3. The process of claim 2 in which the catalyst is activated in the regeneration step at a temperature of 1400°–1600° F.

4. The process of claim 3 in which the naphtha feed has at least 30% of the hydrocarbons boiling in the range of about 177°–217° F.

5. The method of claim 4 in which the catalyst is petroleum coke treated with steam.

References Cited in the file of this patent

UNITED STATES PATENTS

| | | |
|---|---|---|
| 1,967,636 | Towne | July 24, 1934 |
| 2,353,119 | Workman | July 4, 1944 |
| 2,428,715 | Marisic | Oct. 7, 1947 |
| 2,587,425 | Adams et al. | Feb. 26, 1952 |